United States Patent
Kölbl et al.

(10) Patent No.: US 11,920,646 B2
(45) Date of Patent: Mar. 5, 2024

(54) METHOD FOR OPERATING A FRICTION-LOCKING SHIFT ELEMENT OF A TRANSMISSION, AND CONTROL UNIT

(71) Applicant: ZF Friedrichshafen AG, Friedrichshafen (DE)

(72) Inventors: Philipp Kölbl, Friedrichshafen (DE); Michael Miller, Leutkirch (DE); Jonas Knör, Erbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/338,458

(22) Filed: Jun. 21, 2023

(65) Prior Publication Data
US 2023/0407926 A1 Dec. 21, 2023

(30) Foreign Application Priority Data
Jun. 21, 2022 (DE) ...................... 10 2022 206 209.4

(51) Int. Cl.
*F16D 48/06* (2006.01)
*F16D 13/52* (2006.01)
*F16D 13/64* (2006.01)

(52) U.S. Cl.
CPC ............ *F16D 48/06* (2013.01); *F16D 13/52* (2013.01); *F16D 13/648* (2013.01);
(Continued)

(58) Field of Classification Search
CPC ........ F16D 48/06; F16D 13/25; F16D 13/648; F16D 2500/10412; F16D 2500/1045; F16D 2500/50236
(Continued)

(56) References Cited

U.S. PATENT DOCUMENTS 4,624,349 A * 11/1986 Watanabe ......... B60W 30/1819
477/175
4,663,983 A * 5/1987 Kobayashi .............. F16D 47/00
192/214.1
(Continued)

FOREIGN PATENT DOCUMENTS

DE   102011089031 A1   6/2013
DE   102018210223 A1   12/2019
(Continued)

OTHER PUBLICATIONS

German Search Report DE 10 2022 206 209.4, dated Mar. 7, 2023. (10 pages).

*Primary Examiner* — Colby M Hansen
(74) *Attorney, Agent, or Firm* — Dority & Manning, P.A.

(57) ABSTRACT

A method for operating a friction-locking shift element of a transmission of a motor vehicle includes actuating the friction-locking shift element for engagement according to a pressure versus torque characteristic curve. The pressure versus torque characteristic curve has a first characteristic point (a touch point) and a second characteristic point (a contact point), defines a first characteristic curve range between the touch point and the contact point having a first functional dependence, and defines a second characteristic curve range at or after the contact point having a second functional dependence. Once the touch point is reached, the friction-locking shift element begins to transmit torque mainly due to drag torques. Whereas, once the contact point is reached, the friction-locking shift element begins to transmit torque mainly due to friction between shift-element halves of the friction-locking shift element.

9 Claims, 4 Drawing Sheets

(52) U.S. Cl.
CPC .............. *F16D 2500/10412* (2013.01); *F16D 2500/1045* (2013.01); *F16D 2500/50236* (2013.01)

(58) Field of Classification Search
USPC .......................................................... 701/67
See application file for complete search history.

(56) References Cited

U.S. PATENT DOCUMENTS

| | | | |
|---|---|---|---|
| 4,727,767 A * | 3/1988 | Aiki ...................... | F16F 15/139 464/68.41 |
| 9,587,685 B2 | 3/2017 | Bader et al. | |
| 9,746,074 B2 * | 8/2017 | Kitazawa ........ | B60W 30/18027 |
| 10,054,174 B2 | 8/2018 | Langhanki et al. | |
| 2014/0324309 A1 * | 10/2014 | Karpenman ............ | F16D 48/06 701/68 |
| 2020/0182314 A1 | 6/2020 | Wei et al. | |

FOREIGN PATENT DOCUMENTS

| | | |
|---|---|---|
| WO | WO 2012/139546 A1 | 10/2012 |
| WO | WO 2013/075687 A2 | 5/2013 |
| WO | WO 2018/014905 A1 | 1/2018 |

* cited by examiner

US 11,920,646 B2

METHOD FOR OPERATING A FRICTION-LOCKING SHIFT ELEMENT OF A TRANSMISSION, AND CONTROL UNIT

CROSS-REFERENCE TO RELATED APPLICATION

The present application is related and has right of priority to German Patent Application No. 10 2022 206 209.4 filed on Jun. 21, 2022, the entirety of which is incorporated by reference for all purposes.

FIELD OF THE INVENTION

The invention relates generally to a method for operating a friction-locking shift element of a transmission. The invention also relates generally to a control unit for operating a transmission.

BACKGROUND

A drive train of a motor vehicle includes a prime mover and a transmission connected between the prime mover and a driven end. The transmission converts rotational speeds and torques to provide an available tractive force of the prime mover at the driven end. The transmission includes multiple shift elements, including friction-locking shift elements and/or form-locking shift elements. A friction-locking shift element is, in particular, a clutch or a brake. A form-locking shift element is, in particular, a dog. In every engaged gear of a transmission, a first number of the shift elements of the transmission is engaged and a second number of the shift elements of the transmission is disengaged. In order to implement a gear ratio change, at least one previously engaged shift element is disengaged and at least one previously disengaged shift element is engaged.

If a friction-locking shift element of a transmission, such as, for example, a clutch or a brake, is actuated from a disengaged state toward an engagement state via pressure control, a piston that is used to actuate the shift element undergoes displacement travel.

Along a first segment of the displacement travel, the shift element does not yet transmit torque. The shift element begins to transmit torque and, in fact, initially mainly due to drag torques, only once the piston has reached a position that corresponds to a touch point of the shift element. The shift element begins to transmit torque due to friction between shift element halves only once the shift element has been further engaged beyond the touch point and a clearance of the shift element has been overcome. This dependence between the pressure control and displacement travel of a piston of the shift element is defined by a pressure versus travel characteristic curve of the friction-locking shift element.

US 2020/0182314A1, WO 2012/139546A1, WO 2018/014905A1 and WO 2013/075687A2 as well as U.S. Pat. No. 10,054,174B2 each show such pressure versus travel characteristic curves of a friction-locking shift element of a transmission.

The actual pressure control of a friction-locking shift element is preferably carried out depending on a pressure versus torque characteristic curve. The pressure versus torque characteristic curve is also referred to as a pressure versus power transmission capacity characteristic curve. The power transmission capacity of a friction-locking shift element is understood to mean the torque that is transmissible by the friction-locking shift element.

According to practical experience, the pressure versus torque characteristic curve is defined by a linear dependence between the power transmission capacity and the actuating pressure, which, according to practical experience, has a constant slope beginning at the touch point. However, this only allows for pressure control of a friction-locking shift element that is insufficiently precise and thus, does not meet the highest quality requirements.

As such, there is a need to actuate a friction-locking shift element more precisely with higher quality.

SUMMARY OF THE INVENTION

On the basis thereof, an appropriate method for operating a friction-locking shift element of a transmission as well as a control unit for carrying out the method are provided.

More particularly, a pressure versus torque characteristic curve is used for the pressure control of the friction-locking shift element, where the pressure versus torque characteristic curve has at least two characteristic points, namely a first characteristic point in the form of a touch point and a second characteristic point in the form of a contact point.

Once the touch point has been reached, the friction-locking shift element begins to transmit torque mainly due to drag torques.

Once the contact point has been reached, the friction-locking shift element begins to transmit torque mainly due to friction between shift-element halves of the friction-locking shift element.

The pressure versus torque characteristic curve includes a first characteristic curve range between the touch point and the contact point, the first characteristic curve having a first functional dependence between the power transmission capacity and the actuating pressure, and includes a second characteristic curve range after the contact point, the second characteristic curve having a second functional dependence between the power transmission capacity and the actuating pressure.

In other words, a pressure versus torque characteristic curve is used for the pressure control of a friction-locking shift element, the pressure versus torque characteristic curve being subdivided into at least two different ranges. A first range extends between the touch point and a contact point of the characteristic curve. The contact point is a characteristic point of the pressure versus torque characteristic curve, at which the friction-locking shift element is engaged to a greater extent than at the touch point and at which the friction-locking shift element begins to transmit torque mainly due to the friction between shift-element halves.

A first functional dependence between the power transmission capacity and the actuating pressure is used in the characteristic curve range between the touch point and the contact point, with the first functional dependence deviating from the functional dependence between the power transmission capacity and the actuating pressure in a second characteristic curve range extending from the contact point toward a greater engagement of the shift element.

The invention is based on the finding that a friction-locking shift element cannot be actuated with sufficient accuracy and quality in the range between the touch point and the contact point when the same functional dependence between the power transmission capacity and the actuating pressure is used in the range between the touch point and the contact point as in the range of the pressure versus torque characteristic curve adjoining the contact point.

Preferably, the second functional dependence between the power transmission capacity and the actuating pressure in the second characteristic curve range is a linear dependence or a straight line having a slope. In the first characteristic curve range, the first functional dependence between the power transmission capacity and the actuating pressure is either a linear dependence or a straight line having a slope, wherein the slope of the first functional dependence is greater than the slope of the second functional dependence. Alternatively, in the first characteristic curve range, the first functional dependence between the power transmission capacity and the actuating pressure is a non-linear dependence. For the case in which a linear dependence between the power transmission capacity and the actuating pressure is also used in the range between the touch point and the contact point, the slope is greater in the first characteristic curve range than in the second characteristic curve range adjoining the contact point toward greater engagement. As such, a friction-locking shift element is actuated particularly precisely and with high quality between the touch point and the contact point via a non-linear dependence between the actuating pressure and the power transmission capacity.

For the case in which the friction-locking shift element includes a wave spring, the pressure versus torque characteristic curve has one further characteristic point, namely a characteristic point in the form of a reaction point at which the friction-locking shift element switches from an elastic state into a rigid state as the result of a compression of the wave spring. The pressure versus torque characteristic curve has the second functional dependence between the power transmission capacity and the actuating pressure between the contact point and the reaction point and, after the reaction point, includes a third characteristic curve range having a third functional dependence between the power transmission capacity and the actuating pressure. This refinement of the invention is preferred for the case in which the friction-locking shift element includes a wave spring, where the wave spring is compressed after the clearance has been overcome during the actuation of the friction-locking shift element, until the clutch transitions from an elastic range into a rigid range. In this case, the pressure control of a friction-locking shift element is further improved due to the third functional dependence between the power transmission capacity and the actuating pressure, the third functional dependence adjoining the reaction point of the characteristic curve.

Preferably, the third functional dependence between the power transmission capacity and the actuating pressure in the third characteristic curve range is a linear dependence or a straight line having a slope. In the third characteristic curve range, the slope of the third functional dependence between the power transmission capacity and the actuating pressure is less than the slope of the second functional dependence in the second characteristic curve range. This is preferred in order to further increase the accuracy and thus the quality of the actuation of a friction-locking shift element of a transmission.

A control unit for operating a hydraulic system of a transmission of a motor vehicle according to the method described is also provided.

BRIEF DESCRIPTION OF THE DRAWINGS

Preferred refinements are found in the dependent claims and in the following description. Exemplary embodiments of the invention are explained in greater detail with reference to the drawings, without being limited thereto, wherein:

DETAILED DESCRIPTION

Figure 1:
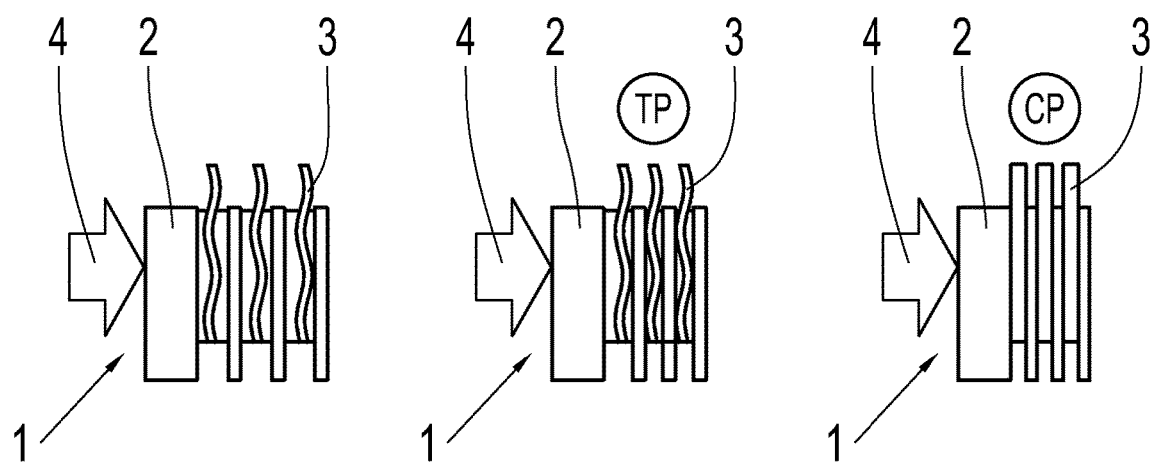
FIG. 1 shows a friction-locking shift element without a wave spring in different engagement positions in accordance with aspects of the present subject matter.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows, in a highly schematic manner, a friction-locking shift element 1 of a transmission in different engagement positions or engagement states. The shift element 1 includes two shift-element halves 2, 3, which are movable in relation to each other and, in the exemplary embodiment shown, are each formed from multiple disks.

In the state illustrated on the left in FIG. 1, the friction-locking shift element 1 is completely disengaged and there is maximum clearance between the shift-element halves 2, 3.

In the state illustrated in the middle in FIG. 1, the friction-locking shift element 1 is engaged up to the touch point TP. At the touch point TP, the friction-locking shift element 1 begins to transmit torque, mainly due to drag torques. At the touch point TP, some clearance is still present between the shift-element halves 2, 3.

In the state illustrated on the right in FIG. 1, the friction-locking shift element 1 is engaged up to the contact point CP, at which the clearance of the shift element 1 between the shift-element halves 2, 3 has been completely overcome and at which the shift element 1 transmits torque, mainly due to friction between the shift-element halves 2, 3.

The engagement of the friction-locking shift element 1 due to the relative motion between the shift elements 2, 3 is induced by pressure control of a piston of the shift element 1. The arrow 4 from FIG. 1 visualizes the pressure control of the piston of the shift element 1.

Figure 2:
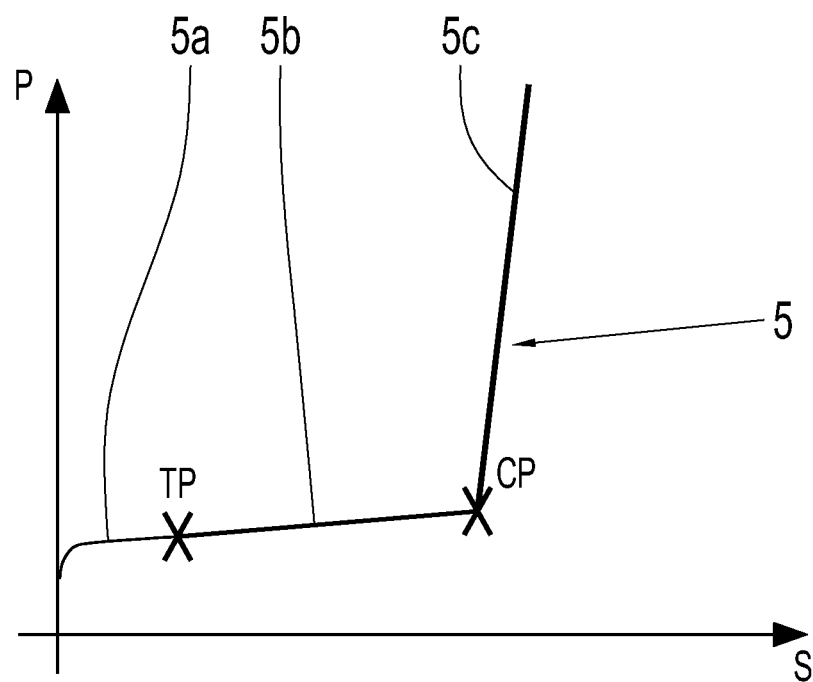
FIG. 2 shows a pressure versus travel distance characteristic curve of the friction-locking shift element from FIG. 1 in accordance with aspects of the present subject matter.

FIG. 2 shows a pressure versus travel position characteristic curve 5 for the friction-locking shift element 1 from FIG. 1, in which the actuating pressure p of the shift element 1 is plotted with respect to displacement travel s. Starting from a completely disengaged shift element, the shift element is actuated to engage via pressure control having a defined pressure p, which causes the piston to then undergo displacement travel s. The shift element 1 does not yet transmit torque in the characteristic curve range 5a of the pressure versus travel position characteristic curve 5 leading up to the point of reaching the touch point TP. Once the touch point TP at the start of the characteristic curve range 5b has been reached, the shift element 1 begins to transmit torque, mainly due to drag torques. If the shift element 1 is further engaged and reaches the contact point CP, the shift element 1 begins to transmit torque, mainly due to friction between the shift-element halves 2, 3. The characteristic curve range 5c of the pressure versus travel characteristic curve 5 adjoins or extends from the contact point CP.

Figure 3:
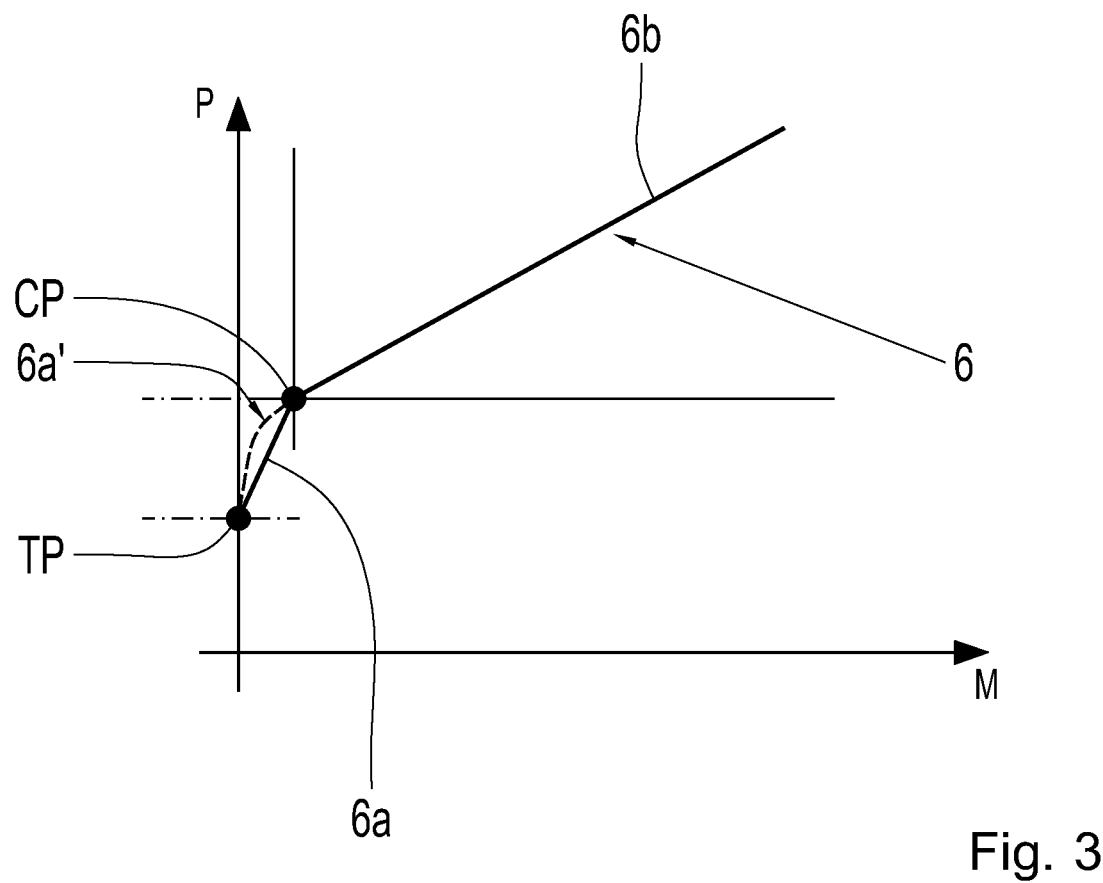
FIG. 3 shows a pressure versus torque characteristic curve of the friction-locking shift element from FIG. 1 in accordance with aspects of the present subject matter.

According to the invention, a pressure versus torque characteristic curve 6 is used for the pressure control of such a friction-locking shift element 1. As shown in FIG. 3, the pressure versus torque characteristic curve 6 is also characterized by two characteristic points, namely by the touch point TP and the contact point CP. The pressure versus torque characteristic curve 6 from FIG. 3 shows the actuating pressure p plotted with respect to the transmissible torque M. The pressure versus torque characteristic curve includes a first characteristic curve range 6a between the touch point TP and the contact point CP. The first characteristic curve range 6a has a first functional dependence between the power transmission capacity M and the actuating pressure p. After the contact point CP, this first characteristic curve range 6a is adjoined by a second characteristic curve range 6b. The second characteristic curve range 6b is characterized by a second functional dependence between the power transmission capacity M and the actuating pressure p.

The second functional dependence between the power transmission capacity M and the actuating pressure p in the second characteristic curve range 6b is a linear dependence or a straight line having a defined slope.

In some instances, the first functional dependence between the power transmission capacity M and the actuating pressure p in the first characteristic curve range 6a between the touch point TP and the contact point CP is also a linear dependence or a straight line, where a slope of the straight line in the first characteristic curve range 6a is greater than a slope of the straight line in the second characteristic curve range 6b.

The functional dependences between the power transmission capacity M and the actuating pressure p in the two characteristic curve ranges 6a, 6b deviate from each other at least with respect to the slopes of the straight lines.

FIG. 3 also shows, via a dashed line, an alternative first functional dependence 6a' between the power transmission capacity M and the actuating pressure p between the touch point TP and the contact point CP. This non-linear dependence is defined, for example, via a logarithmic function or a hyperbolic function.

It is pointed out that, although the logarithmic function or the hyperbolic function is preferred, other non-linear dependences are also usable.

Figure 4:
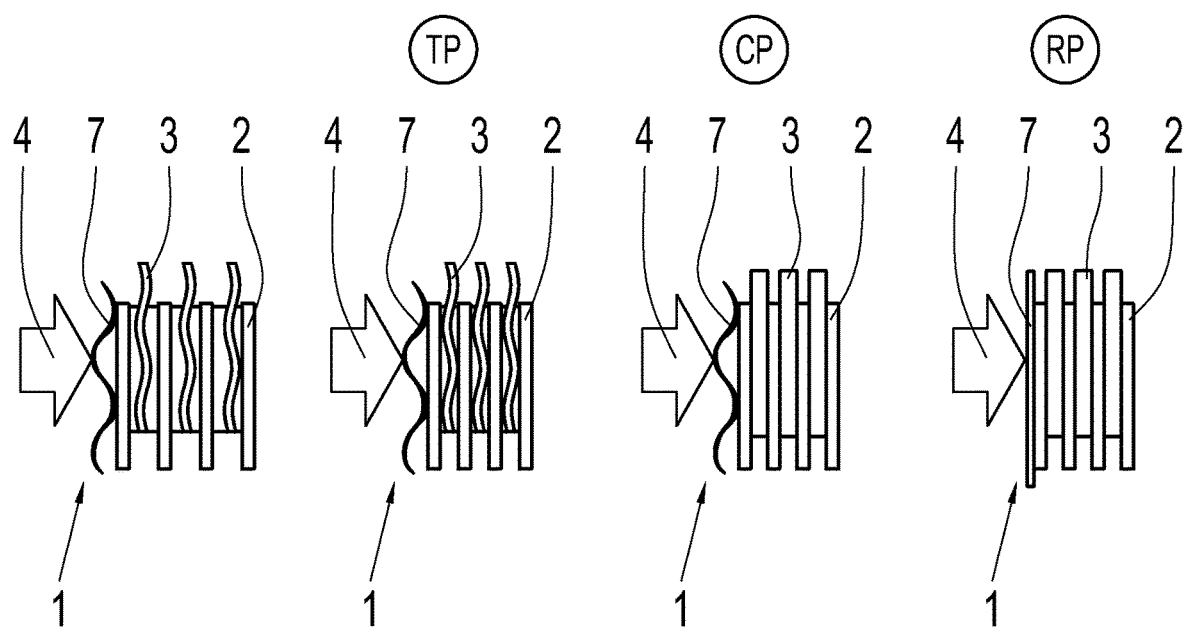
FIG. 4 shows a friction-locking shift element including a wave spring in different engagement positions in accordance with aspects of the present subject matter.

FIG. 4 shows a shift element 1 of a transmission, which, in comparison to the shift element from FIG. 1, additionally includes a wave spring 7. If the shift element 1 from FIG. 4 is actuated past the contact point CP where the clearance between the shift-element halves 2, 3 has been overcome, the wave spring 7 is subsequently compressed, where the shift element 1 then transitions from an elastic state into a rigid state once a reaction point RP has been reached.

Figure 5:
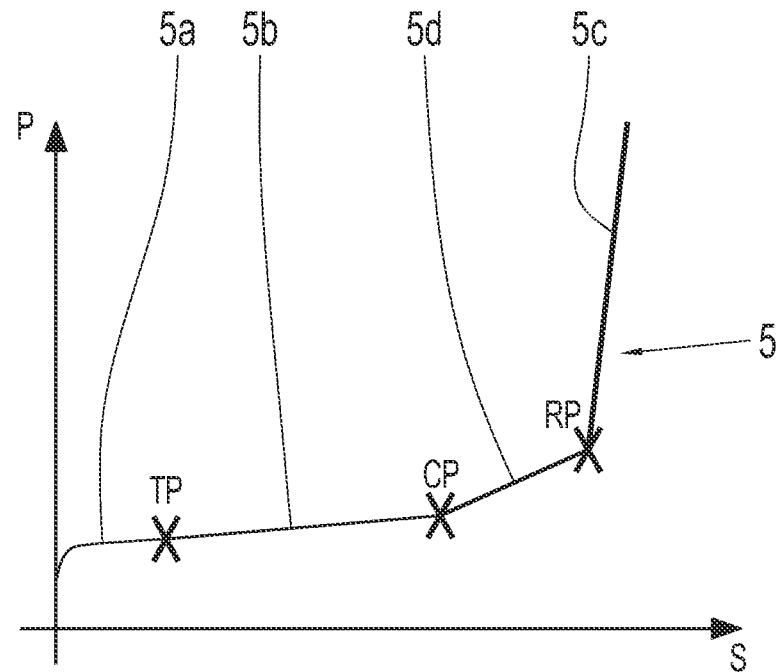
FIG. 5 shows a pressure versus travel distance characteristic curve of the friction-locking shift element from FIG. 4 in accordance with aspects of the present subject matter.
Figure 6:
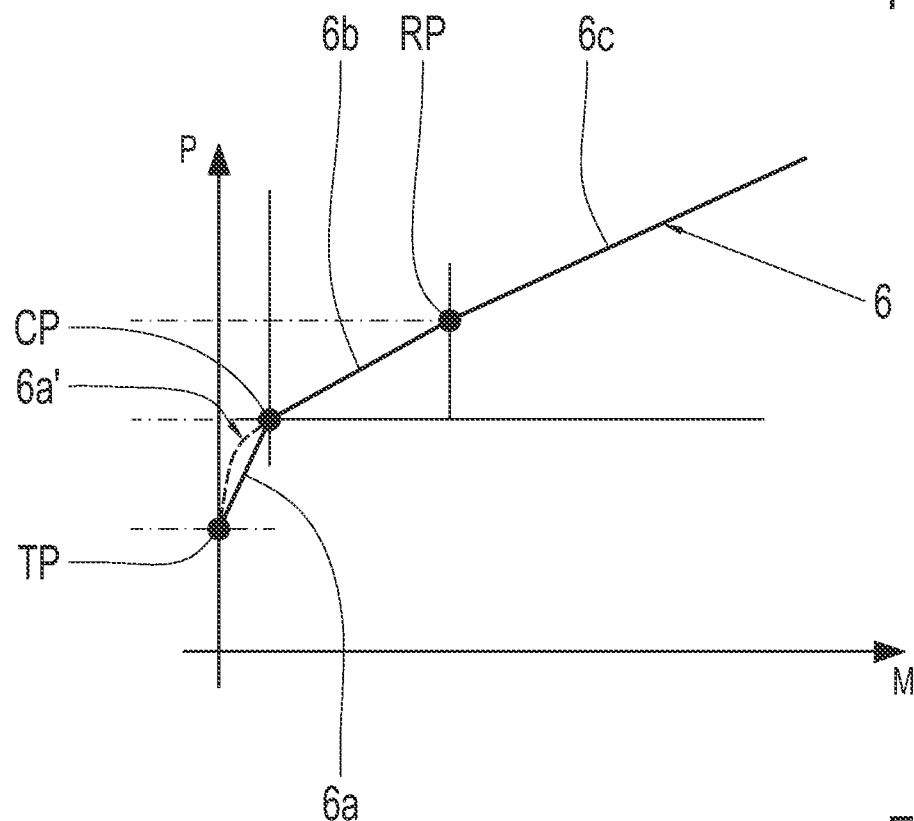
FIG. 6 shows a pressure versus torque characteristic curve of the friction-locking shift element from FIG. 4 in accordance with aspects of the present subject matter.

In the case of a shift element 1 including such a wave spring 7 as in FIG. 4, the pressure versus travel distance characteristic curve 5 includes the additional range 5d between the contact point CP and the reaction point RP, as shown in FIG. 5, where the range 5c now extends from the reaction point RP. Similarly, for a shift element 1 including such a wave spring 7 as in FIG. 4, the pressure versus torque characteristic curve 6 shown in FIG. 6 includes a third characteristic curve range 6c having a third functional dependence between the power transmission capacity M and the actuating pressure p.

The second functional dependence between the power transmission capacity M and the actuating pressure p exists between the contact point CP and the reaction point RP and is defined by a linear dependence. This second characteristic curve range 6b having the second functional dependence is adjoined by the third characteristic curve range 6c having the third functional dependence between the power transmission capacity M and the actuating pressure p. This third functional dependence is defined as a linear dependence or as a straight line, the slope of the third functional dependence is less than the slope of the straight line in the second characteristic curve range 6b having the second functional dependence.

The invention is based on the basic concept of subdividing the pressure versus torque characteristic curve 6, which is used for actuating a friction-locking shift element 1, into at least two characteristic curve ranges 6a, 6b or 6a', 6b in order to allow for a highly accurate actuation of the shift element 1, in particular between the touch point TP and the contact point CP.

The invention also relates to a control unit, which automatically carries out the above-described method. This control unit is a transmission control unit of a motor vehicle transmission.

A transmission control unit of this type is preferably in the form of an electronic control unit that includes hardware-related means and software-related means. The hardware-related means include data interfaces for exchanging data with the assemblies contributing to the carrying-out of the method according to the invention, such as with a hydraulic actuator for actuating the shift element 1. The hardware-related means also include a processor for data processing and a memory for data storage. The software-related means include program modules, which are implemented in the control unit to automatically carry out the method.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

Reference Characters 1 shift element
2 shift-element half
3 shift-element half
4 pressure control
5 pressure versus travel characteristic curve
5a characteristic curve range
5b characteristic curve range
5c characteristic curve range
5d characteristic curve range
6 pressure versus torque characteristic curve
6a characteristic curve range 6b characteristic curve range
6c characteristic curve range
7 wave spring

The invention claimed is:

1. A method for operating a friction-locking shift element (1) of a transmission of a motor vehicle, the method comprising:
actuating the friction-locking shift element (1) for engagement according to a pressure versus torque characteristic curve (6), the pressure versus torque characteristic curve (6) defining a power transmission capacity of the friction-locking shift element (1) and associated torque that is transmissible by the friction-locking shift element (1) depending on an actuating pressure of the friction-locking shift element (1), the pressure versus torque characteristic curve (6) having a first characteristic point and a second characteristic point, the first characteristic point being a touch point (TP), the second characteristic point being a contact point (CP), the pressure versus torque characteristic curve (6) including a first characteristic curve range (6a, 6a') between the touch point (TP) and the contact point (CP) and a second characteristic curve range (6b) starting at or after the contact point (CP),
wherein, once the touch point (TP) is reached, the friction-locking shift element (1) begins to transmit torque mainly due to drag torques,
wherein, once the contact point (CP) is reached, the friction-locking shift element (1) begins to transmit torque mainly due to friction between shift-element halves (2, 3) of the friction-locking shift element (1),
wherein the first characteristic curve range (6a, 6a') has a first functional dependence (6a, 6a') between the power transmission capacity and the actuating pressure and the second characteristic curve range (6b) has a second functional dependence (6b) between the power transmission capacity and the actuating pressure.

2. The method of claim 1, wherein the second functional dependence between the power transmission capacity and the actuating pressure in the second characteristic curve range (6b) is a linear dependence having a slope.

3. The method of claim 2, wherein the first functional dependence between the power transmission capacity and the actuating pressure in the first characteristic curve range (6a') is a non-linear dependence.

4. The method of claim 3, wherein the non-linear dependence is a logarithmic function or a hyperbolic function.

5. The method of claim 2, wherein the first functional dependence between the power transmission capacity and the actuating pressure in the first characteristic curve range (6a) is a linear dependence having a slope, wherein the slope of the first functional dependence is greater than the slope of the second functional dependence.

6. The method of claim 1, wherein, when the friction-locking shift element (1) includes a wave spring (7), the pressure versus torque characteristic curve (6) has a further characteristic point, the further characteristic point being a reaction point (RP) at which the friction-locking shift element (1) switches from an elastic state into a rigid state as the wave spring (7) compresses,
wherein the pressure versus torque characteristic curve (6) includes the second characteristic curve range (6b) having the second functional dependence between the contact point (CP) and the reaction point (RP) and a third characteristic curve range (6c) after the reaction point (RP), the third characteristic curve range (6c) having a third functional dependence between the power transmission capacity and the actuating pressure.

7. The method of claim 6, wherein the third functional dependence between the power transmission capacity and the actuating pressure in the third characteristic curve range (6c) is a linear dependence having a slope.

8. The method of claim 7, wherein the second functional dependence between the power transmission capacity and the actuating pressure in the second characteristic curve range (6b) is a linear dependence having a slope, and
wherein the slope of the third functional dependence between the power transmission capacity and the actuating pressure in the third characteristic curve range (6c) is less than the slope of the second functional dependence in the second characteristic curve range (6b).

9. A control unit for operating a transmission of a motor vehicle, the control unit automatically carrying out the method of claim 1.

* * * * *